US006977821B2

(12) United States Patent
Aguinaga, Jr. et al.

(10) Patent No.: US 6,977,821 B2
(45) Date of Patent: Dec. 20, 2005

(54) BACKPLANE APPARATUS AND BOARD FOR USE THEREWITH

(75) Inventors: Salvador Aguinaga, Jr., Chicago, IL (US); Dwight Dipert, Fox River Grove, IL (US); Martin Schwan, Chicago, IL (US)

(73) Assignee: 3Com Corporation, Santa Clara, CA (US)

(*) Notice: Subject to any disclaimer, the term of this patent is extended or adjusted under 35 U.S.C. 154(b) by 352 days.

(21) Appl. No.: 10/393,080

(22) Filed: Mar. 20, 2003

(65) Prior Publication Data

US 2004/0184249 A1 Sep. 23, 2004

(51) Int. Cl.[7] ........................ G06F 13/20; G06F 13/36
(52) U.S. Cl. ........................ 361/788; 710/301; 710/305
(58) Field of Search ............................... 710/301, 305, 710/306, 309, 313; 361/785, 788, 790, 803

(56) References Cited

U.S. PATENT DOCUMENTS 5,603,044 A * 2/1997 Annapareddy et al. ..... 710/301
5,812,797 A * 9/1998 Crane et al. ................ 710/100
6,091,609 A * 7/2000 Hutson et al. .............. 361/794
6,349,037 B1 * 2/2002 Draughn et al. ............ 361/788
6,690,584 B2 * 2/2004 Uzuka et al. ............... 361/796
6,822,876 B2 * 11/2004 Goergen ..................... 361/788
6,862,644 B1 * 3/2005 Pendleton et al. .......... 710/305
2002/0097564 A1 * 7/2002 Struhsaker et al. ......... 361/736

* cited by examiner

*Primary Examiner*—John B. Vigushin
(74) *Attorney, Agent, or Firm*—Fitch, Even, Tabin & Flannery

(57) ABSTRACT

A backplane has a plurality of interface slots that each couple to a number of buses. Depending upon the embodiment, these buses include a power distribution bus, a digital ground bus, an earth ground bus, a system timing bus, a time division multiplexed bus, a system control bus, a hardware resource bus, a media data bus, and one or more network distribution buses. Various modules can be interfaced with the backplane and function independently and/or dependently upon one another, including shelf controllers, switches, and application boards. In one embodiment, the backplane can include two backplanes, wherein the second backplane further provides connections between such modules and one or more external connectors.

13 Claims, 9 Drawing Sheets

30

BACKPLANE APPARATUS AND BOARD FOR USE THEREWITH

TECHNICAL FIELD

This invention relates generally to backplane circuit boards.

BACKGROUND

Backplane circuit boards are known in the art. Backplanes are typically used with or without an associated housing and serve to receive two or more other circuit boards. Such other circuit boards typically interface with the backplane circuit board at a right angle and couple via use of edge connectors, pins, or the like. The backplane often provides power to the other circuit boards and further provides signal paths to facilitate the exchange of analog and/or digital signals amongst these other circuit boards.

Notwithstanding the above, known backplane architectures can present problems ranging from mild to significant in a variety of applications. In some settings, known backplanes are not sufficiently flexible to accommodate a desired breadth of other circuit boards and/or applications. In particular, desired power and/or signal exchanges are not always sufficiently supported by existing backplane designs. On the other hand, while many existing backplanes may not support desired functionality, they may nevertheless permit compatible physical coupling with otherwise incompatible circuit boards. When this occurs, significant to severe problems can result, including service interruption and/or damage to the incompatible circuit board, the backplane, other boards that are coupled to the backplane, or any combination of the above.

A number of factors contribute to the difficulty of offering an interconnect and function-rich backplane on the one hand and a backplane that will aid in avoiding potentially damaging interfacing with a genuinely functionally incompatible circuit board. Cost comprises one significant contributing factor. In general, the backplane serves as a relatively low-level infrastructure component and reduced rather than increased associated costs are common design criteria and restrictions. Physical form factor limitations comprise another relatively common and significant contributing factor. Backplanes are often used in association with a card cage or other housing. This, in turn, usually presents outer limits with respect to various physical dimensions including height and width. Notwithstanding such physical limits, system designers typically seek to provide a backplane that can accommodate as many circuit boards as possible. The resultant interface density, in turn, can complicate the achievement of the other design goals noted earlier.

BRIEF DESCRIPTION OF THE DRAWINGS

The above needs are at least partially met through provision of the backplane apparatus and board for use therewith as described in the following detailed description, particularly when studied in conjunction with the drawings, wherein.

Figure 2:
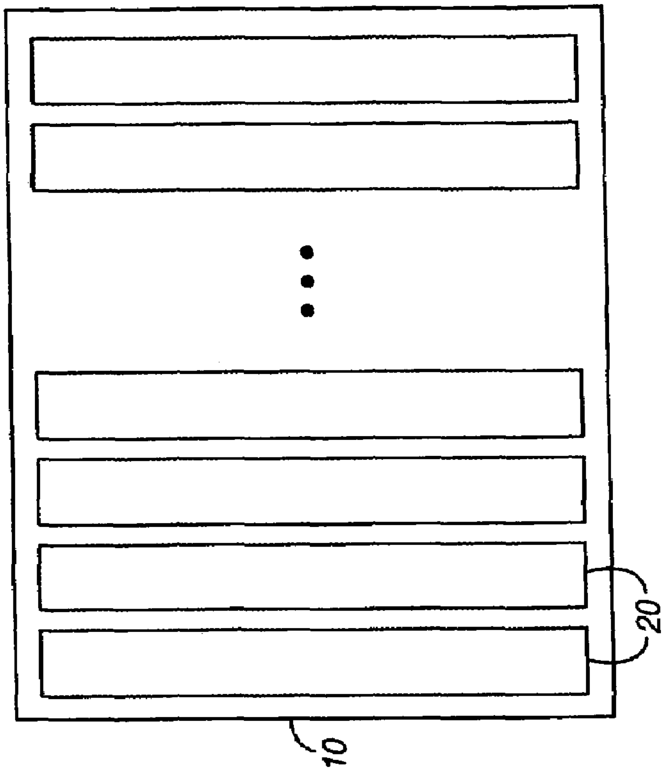
FIG. 2 comprises a front elevational schematic view of a card cage as configured in accordance with an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are typically not depicted in order to facilitate a less obstructed view of these various embodiments of the present invention.

DETAILED DESCRIPTION

Generally speaking, pursuant to some of these various embodiments, a backplane interface comprises a plurality of circuit board interfaces. More particularly, at least some of these circuit board interfaces each includes at least one point of physical/electrical connection to a first ground (such as, in one embodiment, a digital ground), a power distribution bus (which includes, in one embodiment, a multi-pin connector wherein at least one of the multi-pin connectors is not electrically coupled to the backplane), a system timing bus, a system control bus, and a hardware resource bus. So configured, the backplane interface can support various protocols and/or other interface mechanisms that will, in turn, facilitate various identification and control strategies. The backplane therefore can serve to aid in compatibly receiving and supporting a wide variety of circuit boards. In addition, these same elements can further be utilized to aid in discouraging or prohibiting (or at least in reducing potentially resultant discord or damage due to) the introduction of an unauthorized or foreign circuit board to the backplane.

In other embodiments, the backplane interface can further include a time division multiplexed bus, a media data bus, and one or more network distribution buses.

In a preferred embodiment, at least one of the board interfaces comprises a shelf control slot that is adapted and configured to be coupled to one or more shelf controllers. Shelf controllers are generally known in the art and serve to perform management functions with respect to other modules as are coupled to other interfaces on the backplane. To support a desired level of service availability, at least two of the board interfaces will preferably comprise such a shelf control slot. Similarly, in a preferred embodiment, one (and preferably two) of the board interfaces will comprise a switch slot. Such switch slots are each adapted and configured to be coupled to a corresponding switch that can perform switching functions with respect to at least one external communication network and at least one module as is otherwise coupled to the backplane.

The remaining board interfaces can comprise application slots that are adapted and configured to receive and interface with corresponding application circuit boards. In a preferred embodiment, some of these application slots are dual purpose slots. In particular, such dual purpose slots can compatibly interface with an ordinary application board and also with boards that facilitate interaction with, for example, an optical ring such as, for example, a synchronous optical network (SONET) ring network (in fact, any other extended communications link can be supported in this way including other optical linear networks such as the European standard SDH).

In one embodiment, two separate backplanes comprise the backplane. A first backplane comprises a plurality of module-receiving connectors and a plurality of communication paths (as generally referenced above) that operably intercouple the module-receiving connectors. The second backplane, which is preferably physically separate from the first backplane, also comprises a plurality of module-receiving connectors as well as a plurality of external input-output connectors. The second backplane also includes a plurality of communications paths that are operably coupled between the module-receiving connectors and the external input-output connectors. So configured, when a module is disposed to intercouple with both the first and second backplanes, the module will be electrically intercoupled to other modules that are also coupled via the first backplane and electrically intercoupled to components that are disposed external to the backplane and related apparatus via the second backplane.

Alone and together, these and other embodiment elements as set forth herein generally tend to permit supporting a wide range of intercoupling and extracoupling needs to thereby support a wide variety of application needs within a relatively compact form factor and at a generally acceptable cost. At the same time, intercoupling with a circuit board that has not been designed for compatible interaction with the backplane can be discouraged.

Figure 1:
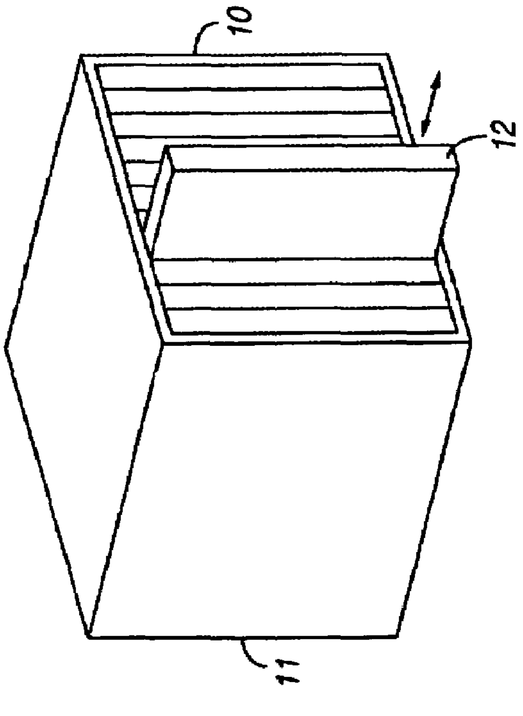
FIG. 1 comprises a perspective schematic view of a card cage as configured in accordance with an embodiment of the invention.

Referring now to FIG. 1, in a preferred embodiment, the backplane will be used in conjunction with a housing 10 such as a card cage, equipment rack, or the like. Typically, the backplane will be disposed towards the rear 11 of the housing 10. With momentary reference to FIG. 2, the front of the housing 10 has a plurality of board-receiving areas 20. There may, or may not, be a forwardly-mounted frame or facing member (as shown in FIG. 2) to define such board-receiving areas 20. Referring again to FIG. 1, circuit boards 12 are typically introduced into the housing 10 through the board-receiving areas 20 and meet the backplane at substantially a 90 degree angle in accordance with well understood practice. In a preferred embodiment, the housing 10 is of sufficient width to permit retention of seventeen such circuit boards 12 (for purposes of clarity, a lesser number of circuit boards 12 are illustrated in FIG. 1).

It should be noted that other embellishments may be desirable for the housing in a given application. For example, the housing 10 itself may be adapted and configured to mount within a corresponding rack or shelf. As another example, the circuit boards 12 and/or the housing 10 may have one of more guides and/or clips or other holding mechanisms to aid in properly receiving and retaining the circuit board 12. These and other such accouterments are well known in the art and hence are not presented here in order to better preserve clarity and focus.

Figure 3:
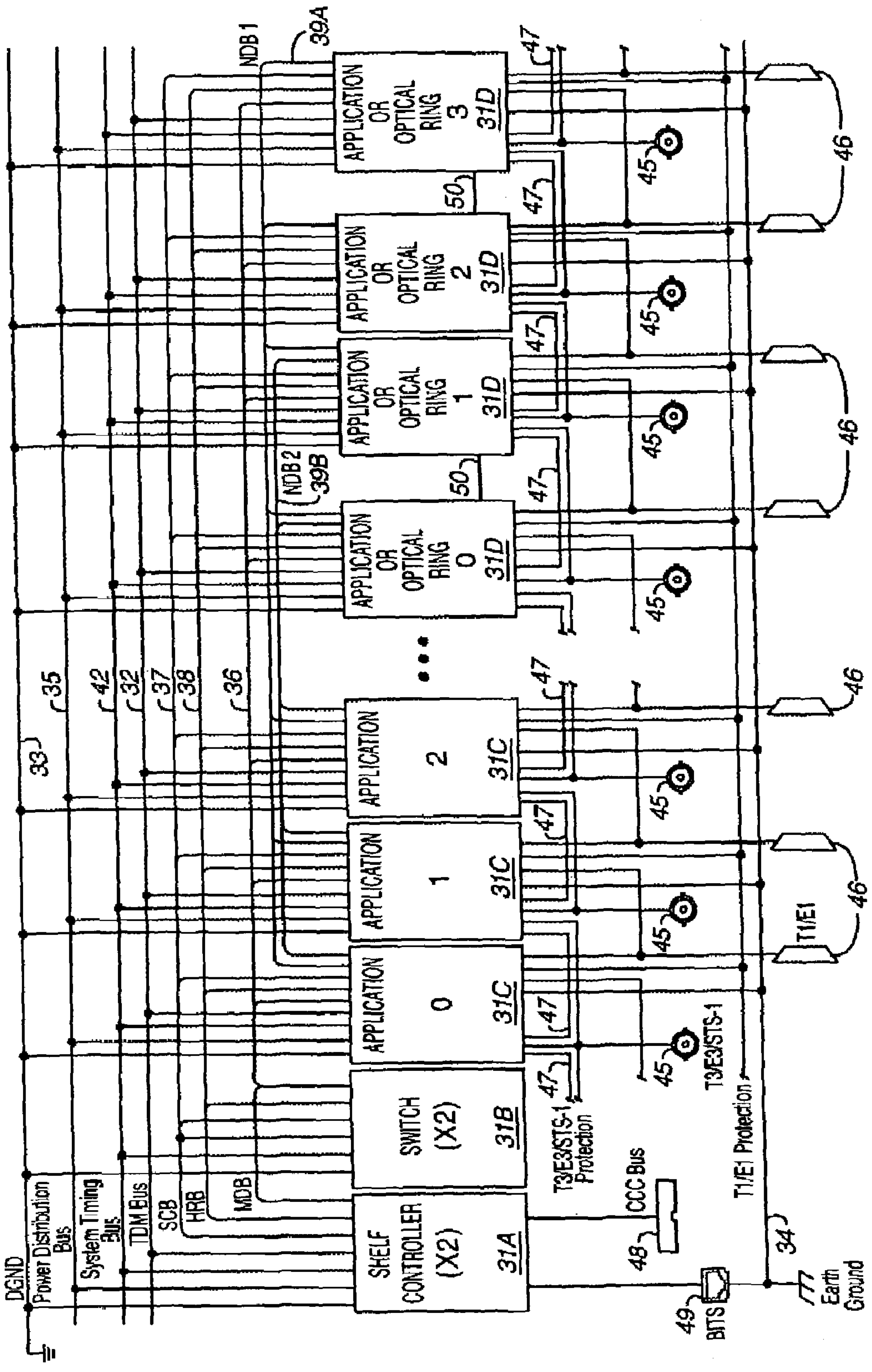
FIG. 3 comprises a schematic view of a backplane interface as configured in accordance with an embodiment of the invention.

Referring now to FIG. 3, various embodiments of the backplane will now be set forth in more detail. The backplane 30 includes a plurality of board interfaces 31 (or slots as they are sometimes also known). In this embodiment there are eighteen board interfaces (as will be made more clear below, one of the board-receiving areas 20 described earlier serves to accommodate two board interfaces, such that the seventeen board-receiving areas 20 of this preferred embodiment support eighteen board interfaces 31). In particular, in a preferred embodiment, there are two shelf controller interfaces 31A, two switch interfaces 31B, ten application interfaces 31C, and four application/optical ring interfaces 31D. So configured, the backplane 30 can physically accommodate two shelf controllers (thereby permitting full redundancy for this platform and function) and two switches (thereby permitting either full redundancy for this platform and function and/or extensive switching capability). In addition, up to fourteen application circuit boards (or blades as they are sometimes called) can be accommodated, with up to four of those interfaces also being compatible for use with synchronous optical networks (optical ring compatibility comprises a preferred approach, but of course other protocol/communications compatibility to support data, voice, or both could be substituted or included as appropriate to a given intended application).

Figure 4:
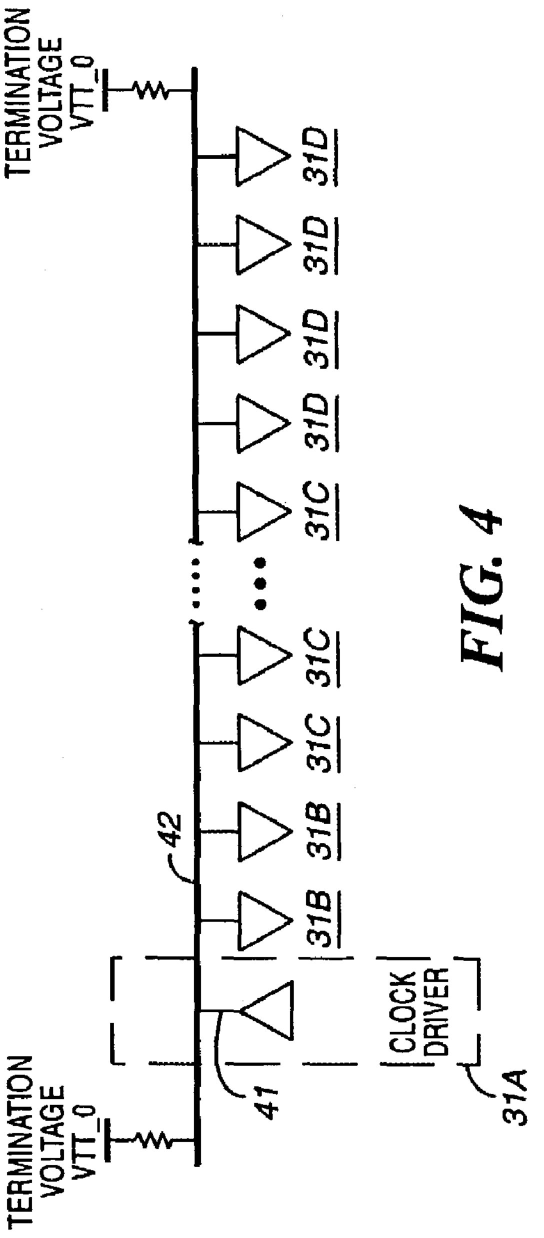
FIG. 4 comprises a schematic view of a system timing bus as configured in accordance with an embodiment of the invention.

The shelf controller interfaces 31A are adapted and configured to accommodate shelf controllers (not shown) as noted above and as otherwise generally understood in the art. Such shelf controllers generally serve to perform various management functions with respect to various modules and circuit boards as are coupled to other of the backplane interfaces 31. As one illustration, and referring momentarily to FIG. 4, the shelf controller(s) can serve to provide one or more clock signals 41 to the remaining backplane interfaces 31 via a system timing bus 42 as detailed in FIG. 4 and as more generally represented in FIG. 3. As another illustration, the backplane 30 also includes a time division multiplexed bus 32 that intercouples to at least the application interfaces 31C and the application/optical ring interfaces 31D. The shelf controller(s) can serve to provide partial or total control of the clocking and framing needs of that time division multiplexed bus 32.

The switch interfaces 31B are similarly adapted and configured to each accommodate a switch (not shown) as noted above and as generally understood in the art. In general, such switches serve to perform data switching functions with respect to at least one of the application interfaces 31C and at least one external communications network.

Figure 5:
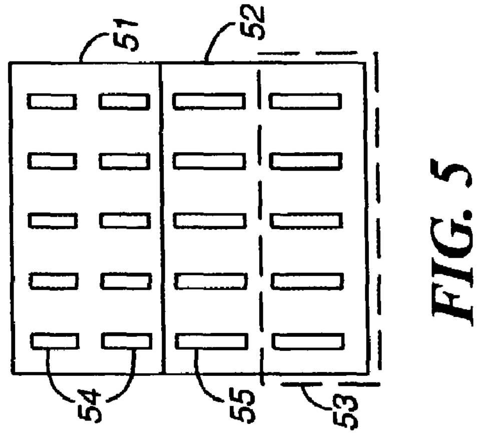
FIG. 5 comprises a top plan view of pin/blade connectors as configured in accordance with an embodiment of the invention.

In general, the backplane 30 comprises only passive electronic elements and primarily only conductive paths. The backplane interfaces 31 in particular are module-receiving areas comprised, in a preferred embodiment, of multi-pin connectors. For example, and with momentary reference to FIG. 5, one or more multi-pin connectors 51 and 52, each comprised of a plurality of conductive pins (also sometimes referred to as electrodes or blades) serve to realize various connections between the backplane 30 and the corresponding circuit board as described below in more detail. Such connectors are well known in the art and further details regarding such connectors will therefore not be provided herein except where appropriate to a given embodiment.

The backplane 30 serves in part to provide a number of buses. Both a digital ground bus 33 and an earth ground bus 34 couple to each interface 31 and a power distribution bus 35 couples to and provides operational power to each interface 31, all in a manner well understood in the art. So configured, a circuit board, when engaged with a corresponding backplane interface 31, will share power and ground(s) with at least some other circuit boards that are also coupled to the backplane 30.

Figure 6:
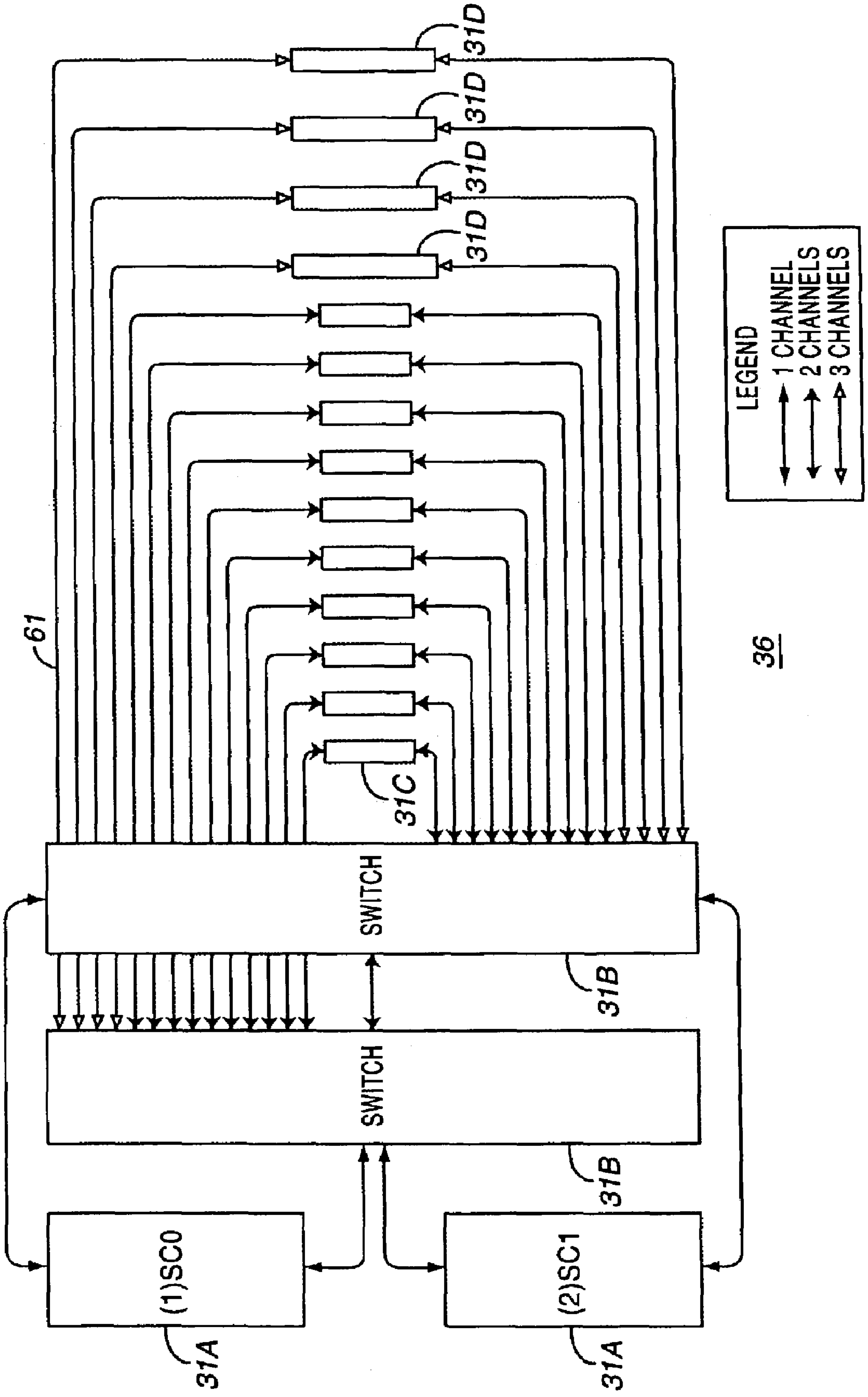
FIG. 6 comprises a schematic view of a media data bus as configured in accordance with an embodiment of the invention.

A system timing bus 42 and a time division multiplexed bus 32 are also provided as already noted above. In addition, the backplane 30 further provides a media data bus 36. With momentary reference to FIG. 6, the media data bus 36 comprises a plurality of point-to-point conductive traces 61 that are disposed between the switch interfaces 31B and the remaining interfaces 31. In a preferred embodiment, this bus 36 utilizes differential signaling (consequently, each pair of conductive traces comprises a single serial data path (or spoke)). A full channel therefore comprises two sets of differential-signaling conductive trace pairs, with one pair serving as a transmit path and the remaining pair serving as a receive path. In a preferred embodiment, these conductive trace pairs of this media data bus 36 carry positive emitter-coupled logic (PECL) signaling levels and data rates of up to 3.125 gigabits per second.

The backplane 30 also provides a system control bus 37 and a hardware resource bus 38. The system control bus 37 again comprises a group of point-to-point serial channels, arranged in a so-called star pattern that originates at each of the shelf controller interfaces 31A with a bus extension terminating at each of the other backplane interfaces 31. The system control bus 37, in a preferred embodiment, once again uses differential pairs of conductive traces that can carry data rates up to about 100 megabits per second.

The hardware resource bus 38 includes a set of serial data lines, a serial clock line, a +3.3V line, and control lines. The data lines are point-to-point single-ended conductive traces that originate at each of the shelf controller interfaces 31A and that extend to each of the remaining backplane interfaces 31. These data lines are bi-directional and support both transmission and reception of relevant signaling. The hardware resource bus clock line provides a clock signal as sourced by a shelf controller to be provided as an input at the remaining interfaces 31. In a preferred embodiment, when two shelf controllers are used, they each receive the other's hardware resource bus clock signal, but only the clock signal from the then master shelf controller will be provided to the remaining interfaces 31. The hardware resource bus 38 also has a dedicated power bus to provide +3.3 volts DC to the other interfaces. In a preferred embodiment, the power supply for this bus can be sourced via a shelf controller and/or via a switch as appropriately coupled to the backplane 30.

Figure 7:
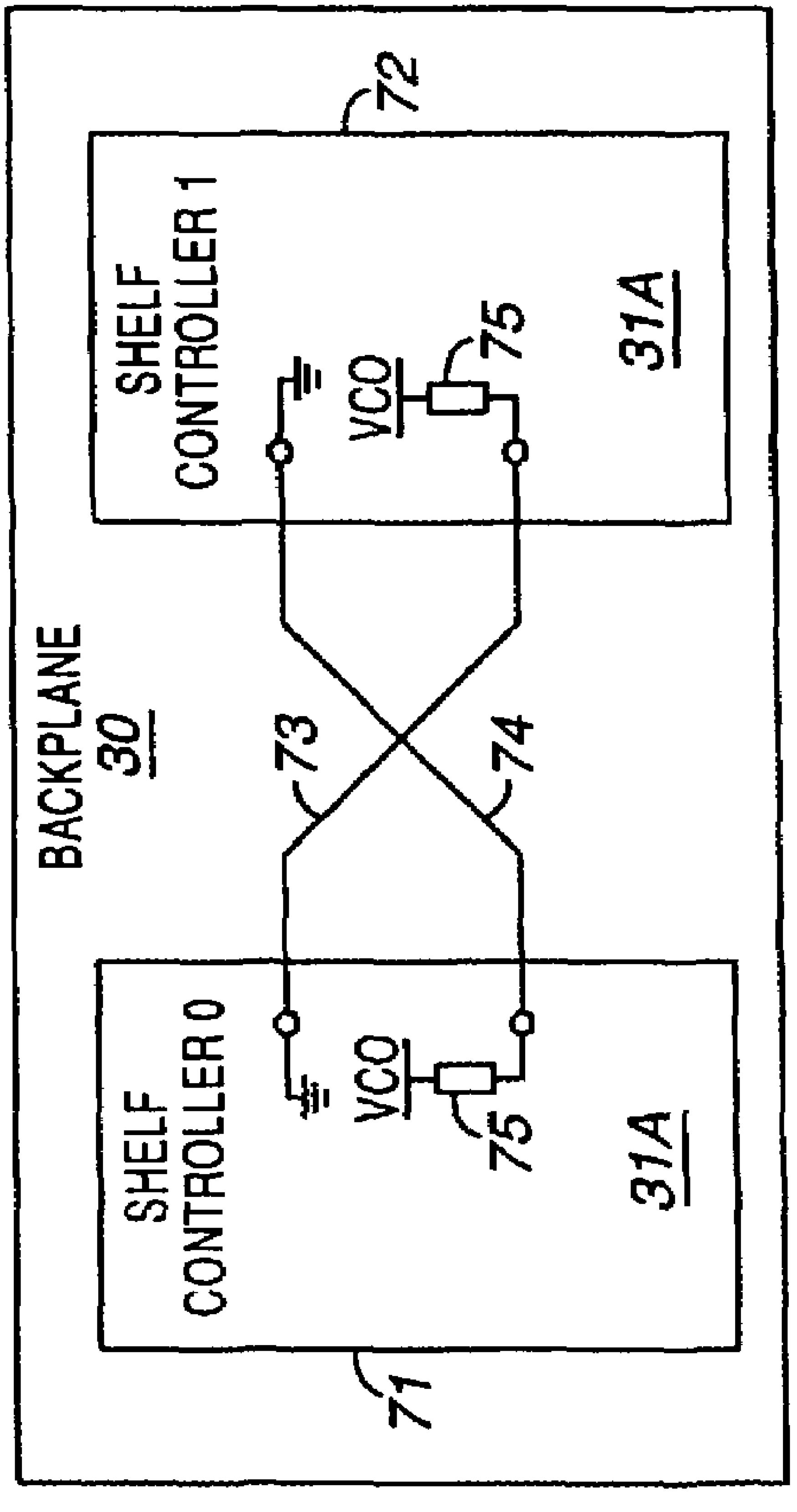
FIG. 7 comprises a schematic view of a shelf controller presence mechanism as configured in accordance with an embodiment of the invention.

The hardware resource bus 38 also provides, in this embodiment, a shelf controller active indication line and a shelf controller presence line. The former serves to let other circuit boards as are coupled to the backplane 30 know which of the shelf controllers is the active shelf controller (when two shelf controllers are coupled to the backplane 30). This shelf controller active indication line comprises a multi-drop line that is driven at any given time by only one shelf controller. Pursuant to one embodiment, this line can be pulled to digital ground 33 by a 10K ohm resistor disposed at each end of the line. Referring now momentarily to FIG. 7, the shelf controller presence line serves to permit the two shelf controllers (when two shelf controllers are coupled to the backplane 30) to indicate their presence to each other. The shelf controller presence line includes, in this embodiment, two conductive traces 73 and 74 formed on the backplane 30 that serve to intercouple a first shelf controller 71 as is coupled to the first shelf controller interface 31A to a second shelf controller 72 as is coupled to the second shelf controller interface 31A. Pursuant to one plan of implementation, each shelf controller 71 and 72 would ground it's own shelf controller presence "Set" line and would provide some appropriate means of detecting this grounded condition on the opposing shelf controller. For example, a pull-up resistor 75 could be used at each shelf controller 71 and 72 to facilitate detection of the other shelf controller.

Referring again to FIG. 3, it has been explained that the backplane 30 provides a number of buses to intercouple various of the backplane interfaces. These buses include a:

Digital ground bus;
Earth ground bus;
Power distribution bus;
System timing bus;
Time division multiplexed bus;
System control bus;
Hardware resource bus; and a
Media data bus.

These buses serve either to facilitate overall system management and/or to permit the exchange of data between various ones of the interfaces.

Figure 8:
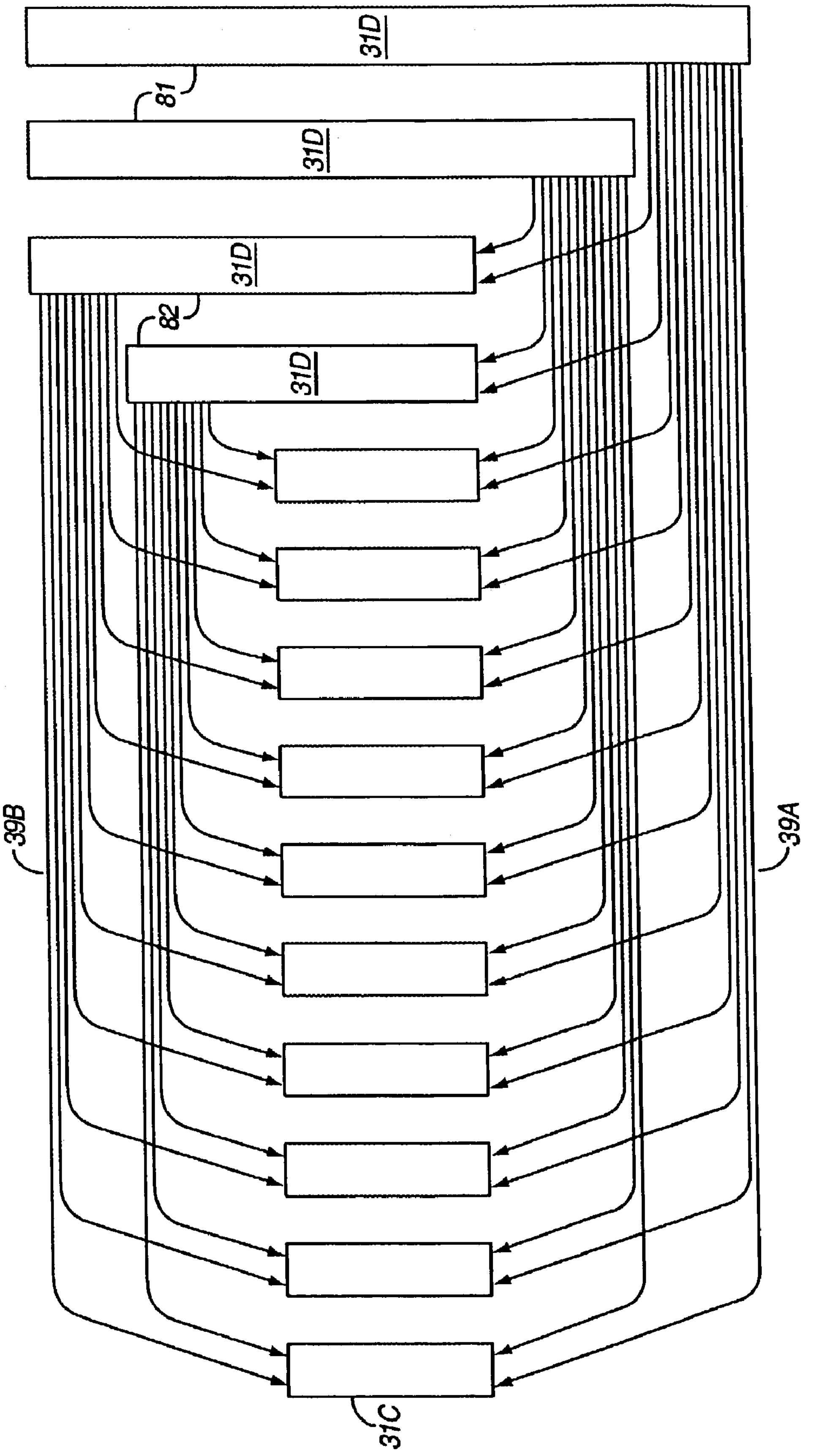
FIG. 8 comprises a schematic view of a network distribution bus as configured in accordance with an embodiment of the invention.

Two other buses are a first and second network distribution bus 39A and 39B. Making momentary reference to FIG. 8, these network distribution buses each comprise a set of point-to-point, serial, differential lines that centralize on the application/optical ring interfaces 31D and effectively serve to effect, in this embodiment, an optical data-to-electrical data distribution system. In this illustration, each line represents a channel that includes both a transmit pair and a receive pair of conductive traces (any suitable driver, and particularly those that operate compatibly with 100 ohm differential impedance transmission lines, such as LVD, PECL, and CML can be effectively deployed for these purposes). Unlike some of the earlier noted buses, the network distribution buses 39A and 39B run only between the application/optical ring interfaces 39D and the application interfaces 39C. The switch interfaces 39B and the shelf controller interfaces 31A are preferably not coupled to the network distribution buses 39A and 39B. In addition, in a preferred embodiment, the first network distribution bus 39A also couples a first pair of application/optical ring interfaces 81 and a second pair of application/optical ring interfaces 82. The second network distribution bus 39B, however, does not. And, in situations that do not require optical ring support, the remaining application/optical ring interface pair 81 could also be used for application circuit boards (so configured, of course, the network distribution bus would then not ordinarily be utilized).

When the application/optical link interfaces 31D are configured to accommodate a SONET or SDH ring, yet another bus can be provided; a protection bus 50 that bridges the application/optical ring 0 interface to the application/optical ring 1 interface and the application/optical ring 2 interface to the application/optical ring 3 interface. The protection bus 50 comprises an electrical interconnect that generally serves to provide a signal path for SONET/SDH ring traffic and/or for passing control data to an adjacent SONET/SDH card for 1+1 or 1:1 automatic protection as otherwise generally understood in the art. This bus 50 particularly serves to aid in preventing a full system failure when an individual card and/or other coupling fails in an optical SONET/SDH ring. In a preferred embodiment, the protection bus 50 can be effected through use of a 40-line wide set of electrical conductors. This will, for most applications, provide sufficient resources to support necessary differential pairs (to support, for example, 2.5 Gbps data streams), spare paths, and the like.

In a fully redundant system, two pairs of ingress/egress cards will be placed in operable contact with the four application/optical ring interfaces 31D. This would still leave ten application interfaces 31C for call processing or ingress data distribution (these being offered as non-limiting examples). In a non-redundant configuration, however, two of the application/optical ring interfaces 82 could be used to accommodate two additional application circuit boards (thereby bringing to twelve the number of application circuit boards that could be usefully accommodated by the backplane 30).

Referring again to FIG. 3, in a preferred embodiment each of the application interfaces 31C and the application/optical ring interfaces 31D couples as a primary interface to both a high speed data BNC connector interface 45 (to accommodate, for example, T3, E3, and STS-1 protocol lines) and a ribbon connector interface 46 (to accommodate, for example, T1 and E1 protocol lines as well as other data streams such as, but not limited to, Ethernet data streams of from 10 to 100 Mbps). In addition, and again pursuant to a preferred embodiment, each of the application and application/optical ring interfaces 31C and 31D also couples as a secondary interface to another one of the BNC connector and ribbon connector interfaces 45 and 46. So configured, each of the interfaces 31C and 31D can serve as a primary interface for a first external communications link and a backup secondary interface for a second external communications link.

To further support redundant system design, in a preferred embodiment, each application interface (regardless of whether only an application interface 31C or an application/optical ring interface 31D) further couples to another application interface via a high speed data link 47 that will accommodate, for example, T3, E3, and/or STS-1 protocols. This link permits one application circuit board to serve as a backup module for another application circuit board as may be desired by a system architect in a given application.

So configured, the backplane 30 can be seen to accommodate a wide variety of applications and external communication links. Redundancy can be readily effected at various levels as desired. Or, if desired, a multi-circuit board system can be readily formed with only partial redundancy or no redundancy at all. Further, optical or other external interfaces can be accommodated and utilized effectively by the application interfaces. When such optical or other external interfaces are not required or desired, however, they need not be provided and the backplane 30 will nevertheless continue to support a rich data exchange architecture.

FIG. 3 also illustrates that the shelf controller interfaces 31A can couple to a chassis controller card bus 48 and a building integrated timing system (BITS) interface 49. The chassis controller card bus 48 comprises a set of digital logic lines that run from each of the shelf controller interfaces 31A to a J6 connector that serves as a main backplane-to-CIB coupler (where CIB refers to a chassis interface board that essential serves simply to provide appropriate connectors to permit ease of interfacing between the backplane 30 and a chassis controller card). The BITS interface 49 provides for BITS Tip, Ring, and Shield termination for both input and output timing signals as well understood in the art. In a preferred embodiment, the backplane can include a BITS board that will serve to support RJ-45 connectors to provide termination for such signals.

Figure 9:
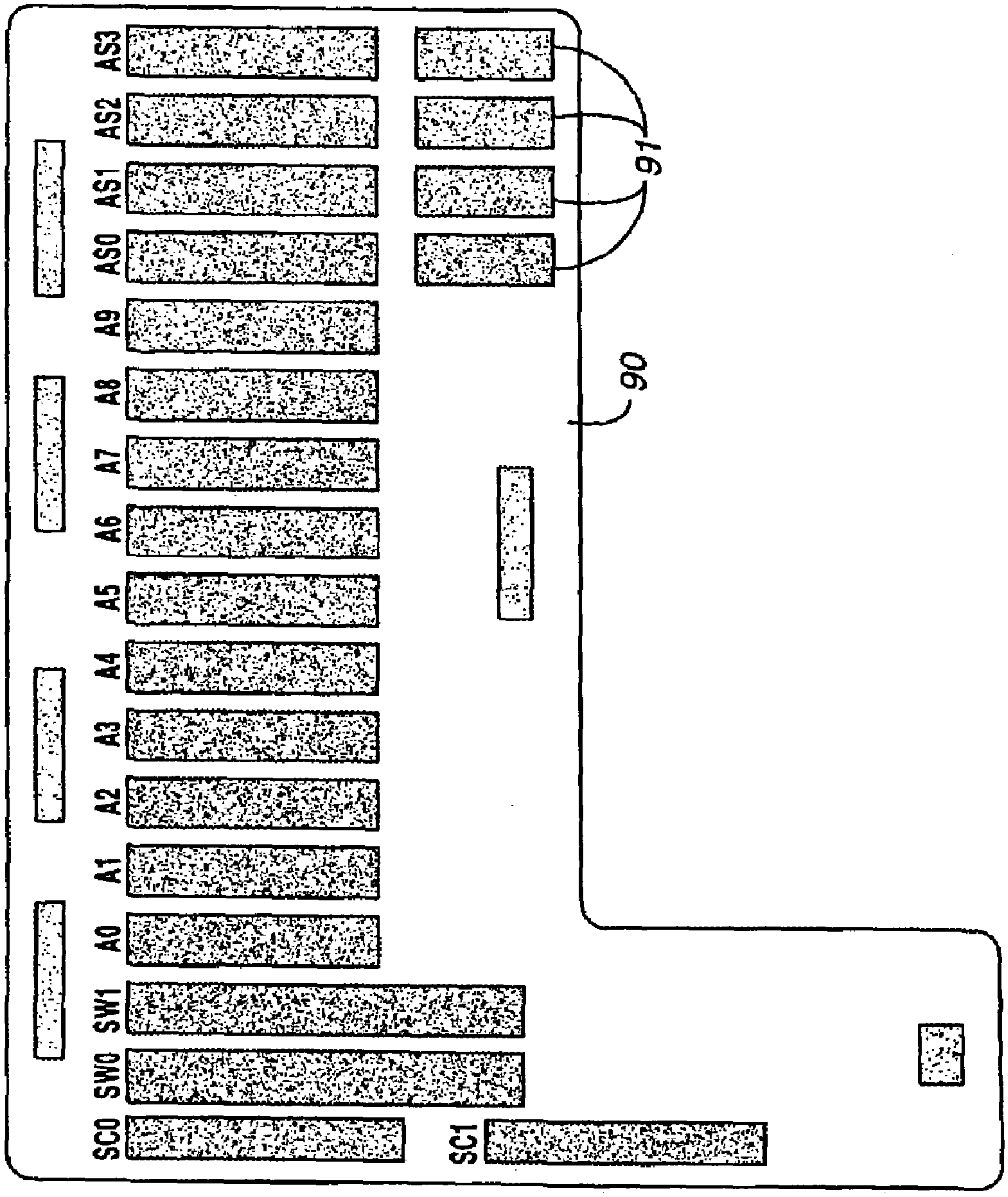
FIG. 9 comprises a top plan diagrammatic view of a first backplane as configured in accordance with an embodiment of the invention.

Certain preferred aspects of a physical embodiment to realize the above backplane 30 will now be presented. To begin, in a preferred embodiment, the backplane 30 can be comprised of, in effect, two separate backplanes. With reference to FIG. 9, a first backplane 90 comprises a printed wiring board (or other similar substrate). The shelf controller interfaces are denoted as SC0 and SC1 and are stacked, in a preferred embodiment, such that both shelf controller interfaces will occupy only a single board receiving area. So configured, it may be expected that two shelf controllers will therefore be included on a single circuit board that can be disposed within this corresponding board receiving area. Two switch interfaces SW0 and SW1 are disposed adjacent the shelf controller interfaces SC0 and SC1. Ten application interfaces A0 through A9 follow and four application/optical ring interfaces AS0 through AS3 essentially complete the interface complement for this first backplane 90. As to the application/optical ring interfaces AS0 through AS3, it may also be noted that an additional area 91 within the board receiving area for each such interface serves to support the optical ring interface and functionality as compared to the application interfaces A0 through A9.

The exact size, shape, and proportion of each such interface area as well as the first backplane 90 itself can be modified as appropriate to suit the needs of a given application. In general, in a preferred embodiment, this backplane will comprise a multilayer board as well understood in the art to accommodate the considerable number of conductive paths that comprise the various buses and other signal paths described above.

Figure 10:
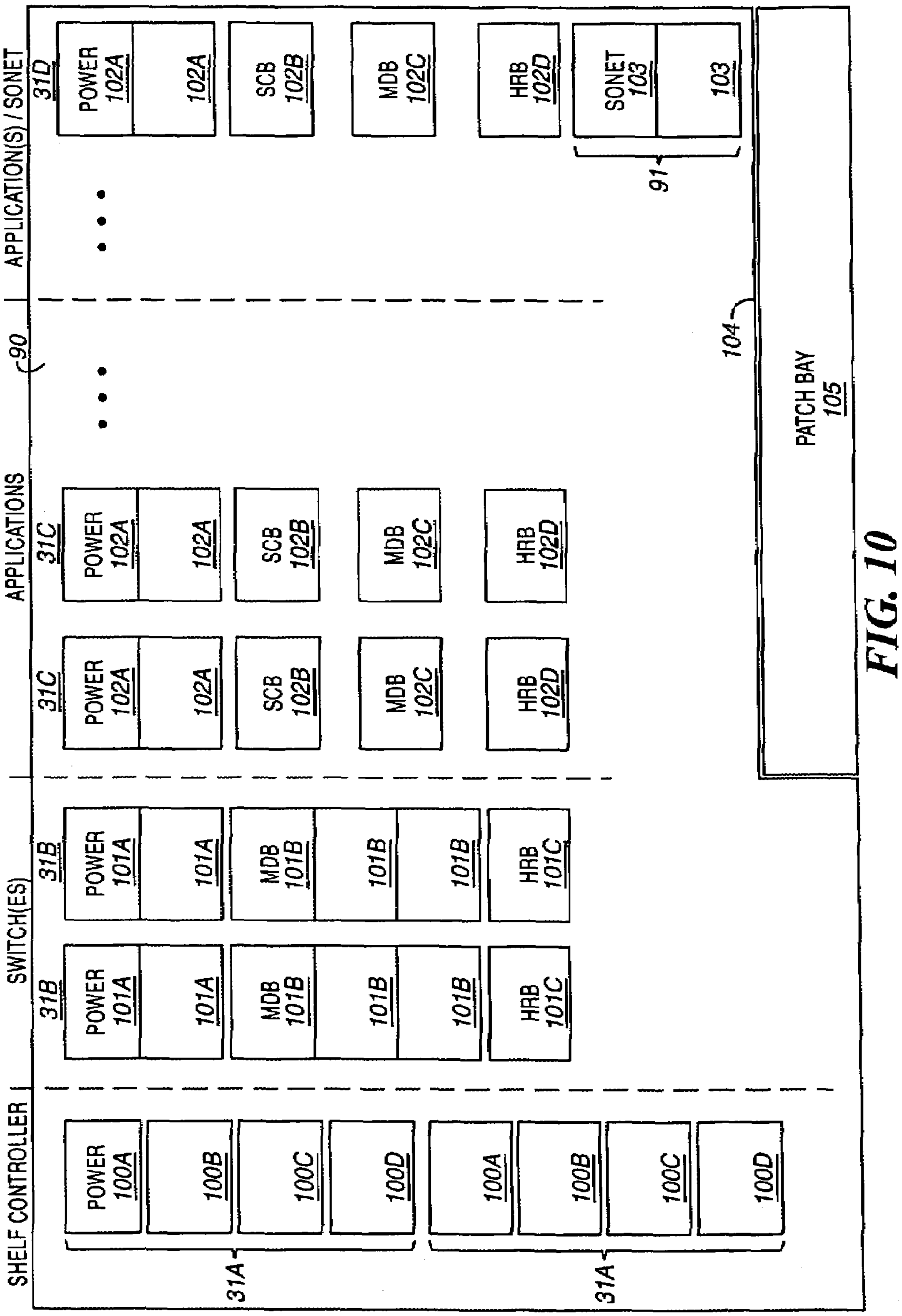
FIG. 10 comprises a top plan diagrammatic view of a first backplane as configured in accordance with an embodiment of the invention.

The above description provides a general overview of the backplane 90 layout. Referring now to FIG. 10, the first backplane 90 is comprised more particularly in this embodiment of a plurality of multi-pin connectors. For some applications, card-edge connectors or other coupling mechanisms might suffice, but in general, multi-pin connectors are preferred. For example, various multi-pin connectors (such as Metral connectors as manufactured and distributed by Framatome Connectors International) will suffice for this application. Such multi-pin connectors comprise housings that each provide a plurality of conductive pins and/or pin-receiving sockets (for example, ten-pin connectors can be used for at least some of the multi-pin connectors in a given embodiment). These conductive pins/sockets serve to aid in physically coupling a given circuit board to the first backplane 90 and to also electrically couple relevant circuit elements of the circuit board to the various buses and other signal paths that are described herein.

As noted above, the two shelf controller interfaces 31A are positioned such that they can share a common board receiving area on the first backplane 90. Each shelf controller interface 31A includes, in this embodiment, four multi-pin connectors, including a first multi-pin connector 100A to provide a power interface, along with a second multi-pin connector 100B, a third multi-pin connector 100C, and a fourth multi-pin connector 100D to provide appropriate coupling as necessary to the other interfaces that are available. A shelf controller circuit board having corresponding multi-pin connectors will be able to mate with such a shelf controller interface 31A and thereby have both power and full access to other interfaces/circuit boards via the various buses.

The next adjacent board receiving areas comprise the two switch interfaces 31B. Each of these interfaces 31B has two multi-pin connectors 101A that couple to the power distribution bus 35, three multi-pin connectors 101B that couple to the media distribution bus 36, and one multi-pin connector 101C that couples to the hardware resource bus 38. Connections to the timing subsystem and the system control bus can be provided through use of these various connectors as well.

In a similar fashion, for the application interfaces 31C, two multi-pin connectors 102A couple to the power distribution bus 35, one multi-pin connector 102B couples to the system control bus 37, one multi-pin connector 102C couples to the media data bus 36, and one multi-pin connector 102D couples to the hardware resource bus 38. These connectors can also be used to facilitate connections to the system timing bus and the TDM bus as convenient and appropriate. The application/optical ring interfaces 31D are substantially identical to the application interfaces 31C while also providing an appropriate connector 103 to provide a optical ring interface.

In one embodiment, not all of the pins of every multi-pin connector are necessarily electrically coupled to the backplane. For example, and with momentary reference to FIG. 5 again, the two multi-pin connectors for the interface power couplings can include one or more conductive pins/sockets 53 that are not electrically coupled to the backplane. So configured, all of the conductive pins/sockets 54 of the upper multi-pin connector 51 are electrically coupled to the power distribution bus, and a first row of conductive pins/sockets 55 of the lower multi-pin connector 52 are similarly electrically coupled to the power distribution bus, but the bottom row 53 is not (other configurations are of course possible and are potentially preferable for different applications). Such a configuration can also serve to provide some protection against the possibility of an inappropriate circuit board being introduced to the backplane.

Referring again to FIG. 10, the above described connectors will suffice to permit a circuit board (such as a shelf controller board, a switch board, an application board, or an application/optical ring board) to be appropriately coupled to the backplane and have appropriate access to the various services and buses that are supported by the backplane. For many applications, however, these connections alone may not be sufficient to support all desired features and/or functionality. For example, F-type connectors may be desired to support coupling to cable-access applications. Therefore, in a preferred embodiment, the backplane 90 includes at least one open area 104 that can receive a second backplane 105. In this particular embodiment, the open area 104 comprises a notch in the first backplane 90 and the second backplane 105 comprises a second printed wiring board that will fit appropriately within the notch. This second backplane 105 can serve a variety of applications as appropriate to a given set of circumstances. In general, however, the connectors and elements (if any) that comprise the second backplane do not couple directly to the buses and interfaces of the first backplane 90 (exceptions, of course, can be observed to suit a given situation, such as a need to share power or ground between the first and second backplanes). Instead, as one example and as a preferred approach, the second backplane 105 comprises, in effect, a patchbay. That is, the second backplane 105 can include, for example, one or more connectors to permit connector-to-connector physical/electrical conversion and/or points of signal ingress/egress.

Although the second backplane 105 is physically separate from the first backplane 90, the second backplane 105 nevertheless can include one or more module-receiving connectors that share board receiving space with the connectors of the first backplane interfaces. So configured, a circuit board that is coupled to the first backplane 90 can also be similarly coupled to the second backplane 105. When the connectors of the second backplane 105 include external input-output connectors, the second backplane 105 can serve to electrically intercouple the inserted circuit board to components (up to and including full networks/systems) that are disposed external to the apparatus that contains the backplane 105 itself. So configured such a circuit board can readily couple to a wide variety of external points via the second backplane 105 while also intercoupling with other backplane-mounted circuit boards via the first backplane 90. Furthermore, a wide and changing variety of external connections can be accommodated in part because the second backplane 105 itself comprises a readily replaceable module. Therefore, different second backplane 105 having different connectors and connection schemes are readily installable and usable without requiring any necessary changes to the first backplane 90.

Figure 11:
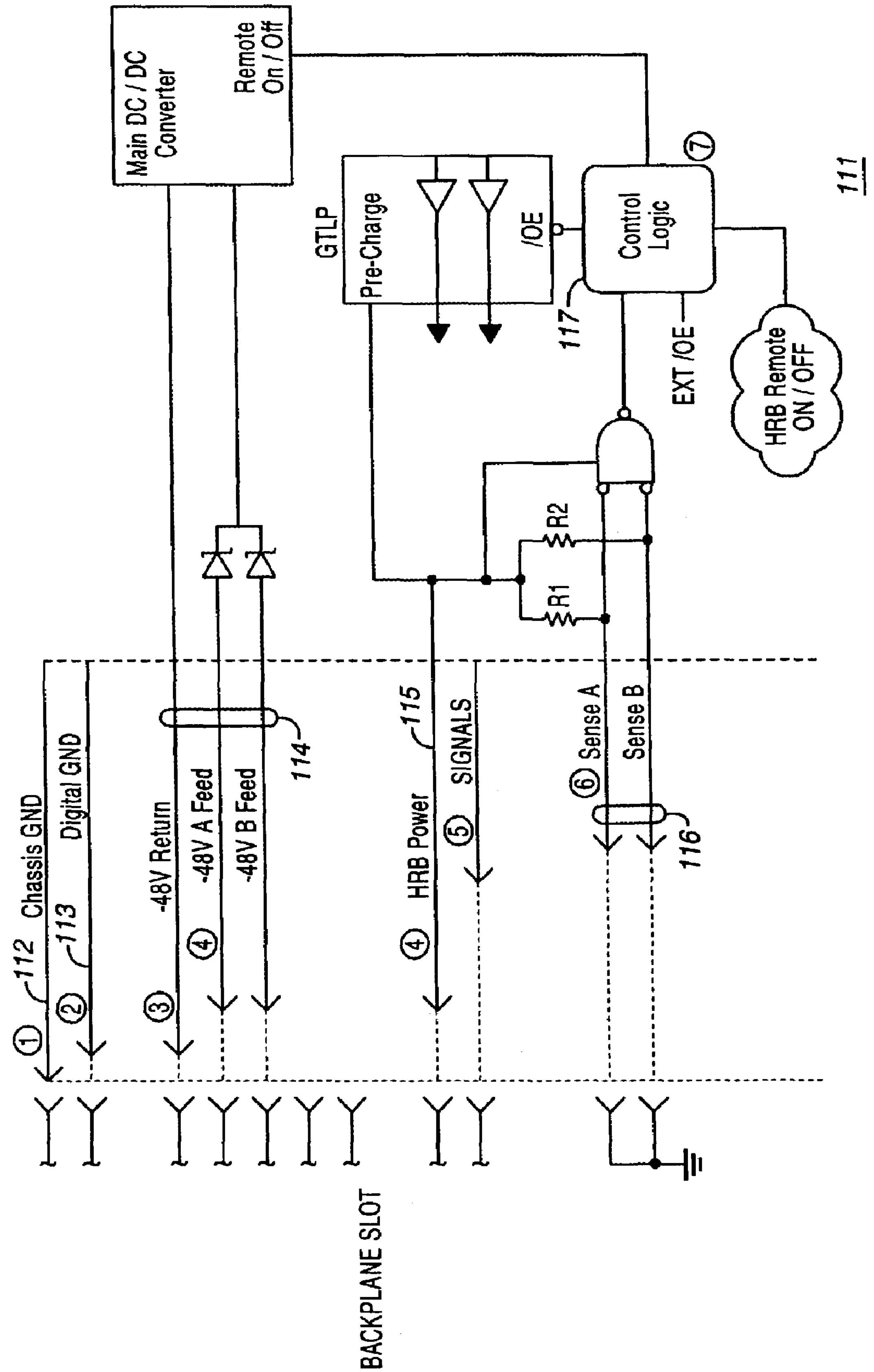
FIG. 11 comprises a schematic view of a circuit board as configured in accordance with an embodiment of the invention.

When using multi-pin connectors as suggested herein, the lengths of the pins (usually on the circuit boards to be inserted into the backplane) will often be varied to implement a make-first scheme to safely accommodate installation of a given circuit board into a fully-powered backplane (for example, to ensure that ground connections are made before power connections are achieved). One preferred example appears in FIG. 11. Generally speaking, such a board 111 will be adapted and configured to successfully couple to the backplane interfaces described above. This can include, as an illustrative example, an appropriate interface 112 to permit coupling to the earth ground 34 of the backplane, an interface 113 to permit coupling to the backplane's digital ground 33, an interface 114 to permit coupling to the backplane's power distribution bus 35, an interface to permit coupling to the hardware resource bus 38 (and in particular, in this illustration, to an HRB power line 115), an interface 116 to permit coupling to one or more of the signal bearing buses (including, for example, clock lines, management spokes, media data spokes, and/or time division multiplexed lines) of the backplane, and an interface 116 to permit coupling to one or more sense lines (for when so-called hot swap sense lines are used, with such sense lines serving to provide an early notification to the hardware logic 117 of the circuit board 111 of when the circuit board is being extracted to thereby permit orderly disablement of some or all circuit board activities prior to power and signal removal).

There are other elements and matters of design choice that would and should likely be considered when designing a specific embodiment that incorporates these teachings. For example, one or more guide pins can be disposed on one or both of the backplanes to aid in guiding a circuit board (such as an application board) into a proper position to ensure accurate registration and coupling of the various connector bodies and surfaces. These and many other variations are generally well known in the art and therefore will not be related here for the sake of brevity and the preservation of focus.

So configured, these backplane embodiments are well suited to facilitate supporting a considerable number of circuit boards of varying types with a rich capacity for redundant system design along with highly varied feature support and subsequent system growth and/or alteration, all at a reasonable corresponding cost. Further, by providing a removable/replaceable patchbay portion, the backplane is further able to accommodate a wide variety of external network/communication links, both now and in the future and to readily permit the benefits of such linkage to be shared across the backplane as desired. Also, the many and varied buses, including in particular the system timing bus, the system control bus, and the hardware resource bus permit a wide variety of system management and control protocols to be readily effected while simultaneously preserving data throughput capacity for other managed buses, such as the media data bus and the network distribution buses.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A backplane interface to accommodate a plurality of boards including a shelf controller board, a switch board, application boards, and application/synchronous optical network boards, comprising:

a plurality of interface slots wherein a plurality of the interface slots comprise system slots that each couple to:
- digital ground;
- a power distribution bus;
- a system timing bus;
- a time division multiplexed bus;
- a system control bus;
- a hardware resource bus; and
- a media data bus;

and wherein:

one of the system slots comprises a shelf controller board slot;

one of the system slots comprises a switch board slot;

a plurality of the system slots comprise application board slots; and a plurality of the system slots comprise application/synchronous optical network board slots.

2. The backplane interface of claim 1 wherein at least one of the application/synchronous optical network board slots sources a first network distribution bus.

3. The backplane interface of claim 2 wherein at least some of the application board slots each operably couple to the first network distribution bus.

4. The backplane interface of claim 3 wherein at least another one of the application/synchronous optical network board slots sources a second network distribution bus.

5. The backplane interface of claim 4 wherein at least some of the application board slots each operably couple to the second network distribution bus.

6. The backplane interface of claim 5 wherein all of the application board slots each couple operably to both the first and the second network distribution bus.

7. The backplane interface of claim 1 wherein each of the application board slots connects to one of the applications/synchronous optical network board slots as a primary external communications link.

8. The backplane interface of claim 7 wherein each of the application board slots also connects to another of the applications/synchronous optical network board slots as a redundant external communications link.

9. The backplane interface of claim 8 where each of the application board slots:

connects to a second applications/synchronous optical network board slot as a primary interface to a second external communications link; and also connects to another of the second applications/synchronous optical network board slot as a redundant interface to that another second external communications link.

10. The backplane interface of claim 9 wherein the external communications link comprises at least a T1 communications link and the second external communications link comprises at least a T3 communications link.

11. An apparatus comprising:

a backplane comprising a plurality of board-receiving areas, wherein a first one of the plurality of board-receiving areas comprises a first controller-receiving area adapted and configured to receive a first apparatus-controller board and a second one of the plurality of board-receiving areas comprises a second controller-receiving area adapted and configured to receive a second apparatus-controller board;

a plurality of multi-pin connectors disposed within at least some of the plurality of board-receiving areas, wherein at least one of the multi-pin connectors comprises a hardware resource bus having a first mode of operation during which the hardware resource bus identifies which of the first and second apparatus-controller boards comprises a master apparatus-controller board.

12. The apparatus of claim 11 wherein at least another of the plurality of board-receiving areas comprises a switch-receiving area.

13. The apparatus of claim 12 wherein at least two of the plurality of board-receiving areas comprise switch-receiving areas.

* * * * *